US010650435B2

(12) United States Patent
Kumar et al.

(10) Patent No.: US 10,650,435 B2
(45) Date of Patent: *May 12, 2020

(54) ELECTRONIC SHOPPING SYSTEM UTILIZING MULTIPLE CONFIGURABLE ITEM ORDERS

(71) Applicant: Walmart Apollo, LLC, Bentonville, AR (US)

(72) Inventors: Vivek Kumar, Muzaffarpur (IN); Dinesh Amarnath Rao Pise, Bangalore (IN); Preetam Purbia, Udaipur (IN); Praveen Deverachetty, Nizampet (IN); Vibhor Rastogi, Meerut (IN); Soumya Ranjan Mohanty, Cuttack (IN)

(73) Assignee: Walmart Apollo, LLC, Bentonville, AR (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/896,944

(22) Filed: Feb. 14, 2018

(65) Prior Publication Data

US 2018/0174225 A1 Jun. 21, 2018

Related U.S. Application Data

(63) Continuation of application No. 14/068,204, filed on Oct. 31, 2013, now Pat. No. 9,928,535.

(51) Int. Cl.
*G06Q 30/00* (2012.01)
*G06Q 30/06* (2012.01)

(52) U.S. Cl.
CPC ............................. *G06Q 30/0633* (2013.01)

(58) Field of Classification Search
CPC ................................................ G06Q 30/0633
USPC ............................................... 705/26.1–27.2
See application file for complete search history.

(56) References Cited

U.S. PATENT DOCUMENTS

| 6,496,568 | B1 | 12/2002 | Nelson |
| 6,850,971 | B1 | 2/2005 | Murakoshi |
| 7,756,752 | B2 | 7/2010 | Duvall |

(Continued)

OTHER PUBLICATIONS

Cheng, J.; "The New Age of Online Grocery Shopping"; http://arstechnica.com/business/2010/03/the-new-age-of-online-grocery-shopping/; Mar. 7, 2010; pp. 1-3 (Year: 2010).*

(Continued)

*Primary Examiner* — Jason B Dunham
*Assistant Examiner* — Anand R Loharikar
(74) *Attorney, Agent, or Firm* — Fitch, Even, Tabin & Flannery LLP

(57) ABSTRACT

An electronic shopping system, such as an ecommerce retail website, is constructed and programmed to provide online shoppers with the ability to create and manage multiple configurable item orders contemporaneously within a single customer account. Each item in an item order is associated with a "purchase status" which can, in addition to other discrete adjustments, be toggled between "active" and "inactive" states at or before checkout. Each item order is itself configurable in respect of delivery address, payment source, frequency, and schedule. Orders and settings are saved within the customer's account to be recalled, reviewed, refined (if desired), and executed at checkout.

20 Claims, 5 Drawing Sheets

(56) References Cited

U.S. PATENT DOCUMENTS

| | | | |
|---|---|---|---|
| 8,370,271 B1* | 2/2013 | Robinson | G06Q 10/083 705/26.7 |
| 8,583,512 B1* | 11/2013 | Gupta | G06Q 30/06 705/26.1 |
| 2003/0130897 A1 | 7/2003 | Pickover | |
| 2003/0144914 A1 | 7/2003 | Gossard | |
| 2004/0117270 A1 | 6/2004 | Sugahara | |
| 2006/0173749 A1* | 8/2006 | Ward | G06Q 10/08 705/26.8 |
| 2011/0320320 A1 | 12/2011 | Dearlove | |
| 2013/0226807 A1 | 8/2013 | Mascavage, III | |

OTHER PUBLICATIONS

Cheng, J.; "The New Age of Online Grocery Shopping"; http://arstechnica.com/business/2010/03/the-new-age-of-online-grocery-shopping/; Mar. 7, 2010; pp. 1-3.
PCT; App. No. PCT/US2014/063280; International Search Report dated Feb. 11, 2015.
PCT; App. No. PCT/US2014/063280; Written Opinion dated Feb. 11, 2015.
U.S. Appl. No. 14/068,204; Notice of Allowance dated Nov. 15, 2017.
U.S. Appl. No. 14/068,204; Office Action dated Dec. 31, 2014.
U.S. Appl. No. 14/068,204; Office Action dated Sep. 28, 2015.
U.S. Appl. No. 14/068,204; Office Action dated Jun. 10, 2016.
U.S. Appl. No. 14/068,204; Office Action dated Dec. 23, 2016.
U.S. Appl. No. 14/068,204; Office Action dated Jul. 3, 2017.
Wicker, A.; "Why Amazon Subscrive & Save is Great for Moms"; http://learnvest.com/knowledge-center/why-amazon-subscribe-and-save-is-great-for-moms/; Feb. 1, 2012; pp. 1-3.

* cited by examiner

ELECTRONIC SHOPPING SYSTEM UTILIZING MULTIPLE CONFIGURABLE ITEM ORDERS

RELATED APPLICATIONS

This application is a continuation of U.S. application Ser. No. 14/068,204, filed Oct. 31, 2013, which is incorporated herein by reference in its entirety.

FIELD

The present invention relates in general to ecommerce, and in particular, to electronic systems for selling items of merchandise online utilizing multiple configurable item orders.

BACKGROUND

Online stores and ecommerce websites are strategically important and lucrative channels for selling goods and services to consumers. Initially viewed with skepticism, consumer confidence in and adoption of electronic shopping systems has and continues to be vigorous. The U.S. Commerce Department reported recently that 2012 ecommerce sales totaled $225 billion, up from $194.7 billion in 2011. The trend is expected to continue. Analysts are forecasting compounded annual growth rates at greater than 10% over the next five years.

As expected with the expansion of the ecommerce retail segment, gaining and defending market share therein is increasingly challenged by an ever intensifying competitive landscape, where clearly, it is not enough to simply have an active ecommerce presence or website. Innovation is key— and for the attentive mass retailer—an important customer expectation to be ministered responsibly.

Along these lines, in examining areas for improvement in ecommerce website design, the electronic checkout process and use therein of virtual shopping carts has received considerable interest. In particular, it was observed that the shopping cart technology implemented in several existing ecommerce websites can have in certain settings a restrictive effect on online retail activity.

In particular, under the conventional paradigm, a customer is provided with a single virtual shopping cart that is programmed to essentially follow a linear path from "loading" to "checkout". When the path is completed, either by cancellation or by checkout, the cart is "emptied", and only then, readied for reuse for a different order.

On some websites, the customer can indeed stop the cart midway and save it, rather than cancel it. A new or different order nonetheless cannot be placed until the saved cart is checked out, cancelled, or otherwise emptied of the items contained therein belonging to the older order.

While single cart technology can continue to effectively serve customers that shop intermittently or episodically, the process can be cumbersome for customers having frequent purchasing needs that either recur over time or differ contextually. For such customers, every time a need arises to reorder an identical or substantially similar set of items, the customer has to repeat the often monotonous process of finding the items again; adding them to the cart; making sure for each item that the quantity, description, and other pertinent item parameters are correct; reviewing the order's delivery and payment settings; and then submitting the order for checkout. Over time, tedious as this routine may become, since no other reasonable alternatives are currently provided, these customers simply continue to absorb the burden.

In short, despite a substantial need and commercial opportunity, there are no known ecommerce systems that allow customers to define, refine, reuse, and automate multiple item orders at or prior to checkout.

SUMMARY

In light of the above need, the present invention provides an electronic shopping system—preferably an ecommerce website—constructed and programmed to provide the users thereof with the ability to create and manage multiple item orders contemporaneously in association with a single customer account.

The "purchase status" of each item in an item order, in addition to other discrete adjustments, is programmed to enable toggling between "active" and "inactive" states at or before checkout. Additionally, each item order is itself programmed to be configurable by the customer in respect of "delivery address", "payment source", "frequency", and "schedule".

Customer orders and settings are saved within the customer's account to be recalled, reviewed, refined (if desired), and ultimately executed at checkout. Preferably, executed orders are similarly retained in the customer's account for a predetermined time period, ready for possible future recall, review, refinement, and resubmission.

The use of multiple configurable orders pursuant to the invention is expected to ease considerably the burden of purchasing frequent and recurring orders—particularly in respect of identical or similar sets of items—and for directing those orders toward different customer needs, purposes, and contexts. Moreover, implementation of multiple configurable order functionality can be accomplished within an existing ecommerce website whilst retaining the site's original single order functionality, e.g., in a default mode of operation.

In light of the above, it is a primary objective of the invention to provide an electronic shopping system constructed and programmed to support multiple configurable item orders for use within or in association with a single customer account.

It is another objective to provide a retail ecommerce website constructed and programmed to support multiple configurable item orders, wherein each item order can be configured by a customer to specify the order's frequency and schedule.

It is another objective to provide a retail ecommerce website constructed and programmed to support multiple configurable item orders, wherein each item placed within an item order has a "purchase status" that can be toggled between "active" and "inactive" states at or prior to checkout.

It is another objective to provide a retail ecommerce website constructed and programmed to support multiple configurable item orders, wherein each item of merchandise can be "placed into" an item order that itself can be save and recalled at a later time for checkout.

It is another objective to provide an electronic shopping system comprising a customer account database, a merchandise selection facility, and a purchase facility, wherein: The "database" comprises several customer account records, each account including at least one unique identifier; the "merchandise selection facility" comprises a catalog of merchandise and means for selecting any item therein for inclusion in at least one of several potential item orders associated with a single customer account; and the "purchase facility" comprises an order review interface for reviewing and modifying item orders and an order submission interface for submitting orders for further processing and fulfillment.

For a further understanding of the nature and objects of the invention reference should be had to the entirety of the description herein taken in conjunction with the accompanying drawings.

DETAILED DESCRIPTION

The electronic shopping system—whether constructed from scratch or upon an exiting existing ecommerce platform—provides customers with the ability to create and manage multiple configurable item orders. By design, the purchase status of each item in an item order can be toggled between active and inactive states at or before checkout. Likewise, each item order is itself configurable by the customer in respect of delivery address, payment source, frequency, scheduling, and the like. Item and order settings are saved within the customer's account to be recalled, edited, reviewed and checked out as desired during each shopping session.

The electronic shopping system comprises a customer account database, a merchandise selection facility, and a purchase facility, wherein: the customer account database comprises a plurality of customer account records, each customer account record including at least one unique customer account identifier; the merchandise selection facility comprises a catalog of merchandise and means enabling a customer to select any item in said catalog for inclusion in at least one of several potential item orders associated with a single customer account record assigned to said customer; and the purchase facility comprises (a) an order review interface for reviewing and modifying any of said item orders associated with said single customer account record and (b) an order submission interface for submitting any of said item orders for order fulfillment.

Within such framework, the electronic shopping system can provide utility and advantage in several and various b2c and b2b commercial scenarios. The principal and preferred application of the invention, however, is a retail ecommerce website providing a virtual storefront and online shopping to retail customers. Operated or under the control of a single retailer or retail entity, the online shopping website is published on the internet and accessible to retail customers either through personal computers, mobile devices, or specialty kiosks.

Figure 2A:
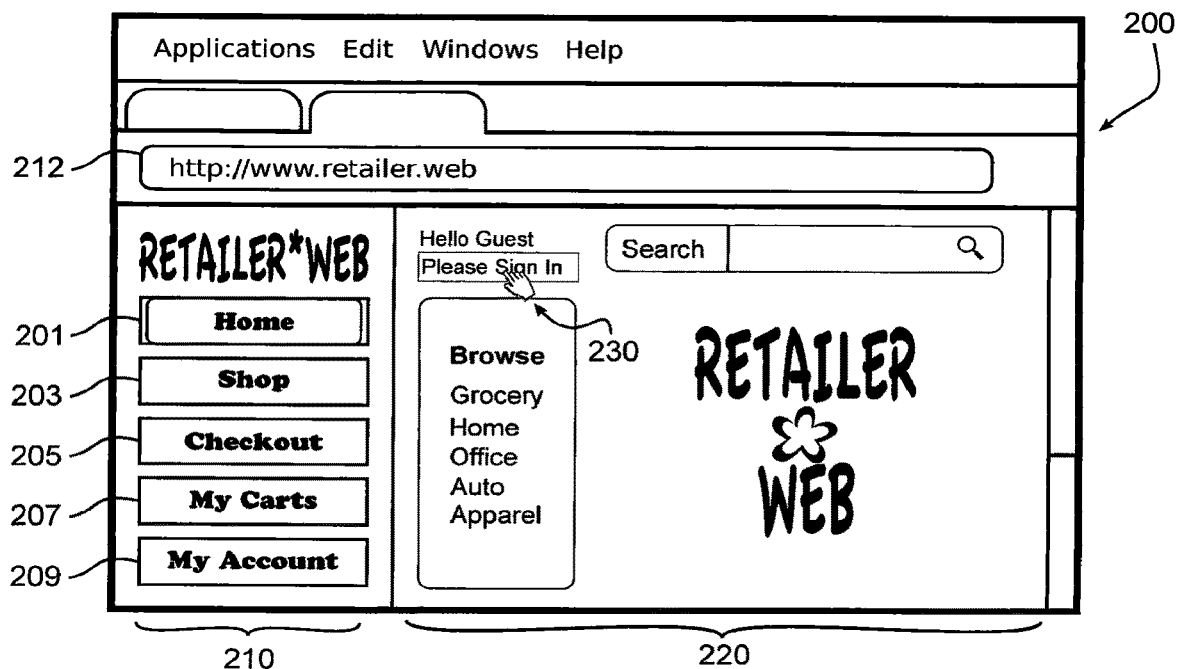
FIGS. 2A and 2B illustrate schematically an ecommerce website 200, and its customer login interface 300 and 310, the website being devised within the contours of the invention.

A representative landing page for such retail ecommerce website is illustrated in FIG. 2A. As shown therein, the ecommerce website 200 (located at URL address 212) provides a menu 210 comprising a plurality of button activated hyperlinks pointing to a number of services, functions, information, and other like content 201-209.

Examples of particular retailers for which multiple item order functionality could be beneficial include, but is not limited to, mass merchandise retailers, grocers, restaurants, and specialty retailers (e.g., electronics, hardware and home improvement, office supply, pharmacy and health care, and auto supply).

In addition to providing enhanced ordering and checkout functionality, implementation of a configurable multi-cart functionality can expand customer coverage at a potentially and comparatively low cost. For example, a b2c mass retailer or grocer can provide a restaurant (typically, a b2b customer) with a flexible and highly configurable means for scheduling and ordering a recurring supply of ingredients and kitchen supplies. Likewise, a b2c hardware store can provide a building contractor (i.e., another b2b-type customer) with a flexible and highly configurable means for scheduling and ordering a recurring supply of nails, screws, wood and other building materials. And finally, a b2c office supply store can provide a professional office (i.e., another b2b-type customer) with a flexible and highly configurable means for scheduling and ordering a recurring supply of paper, notebooks, folders, ink, envelopes and like.

Figure 1:
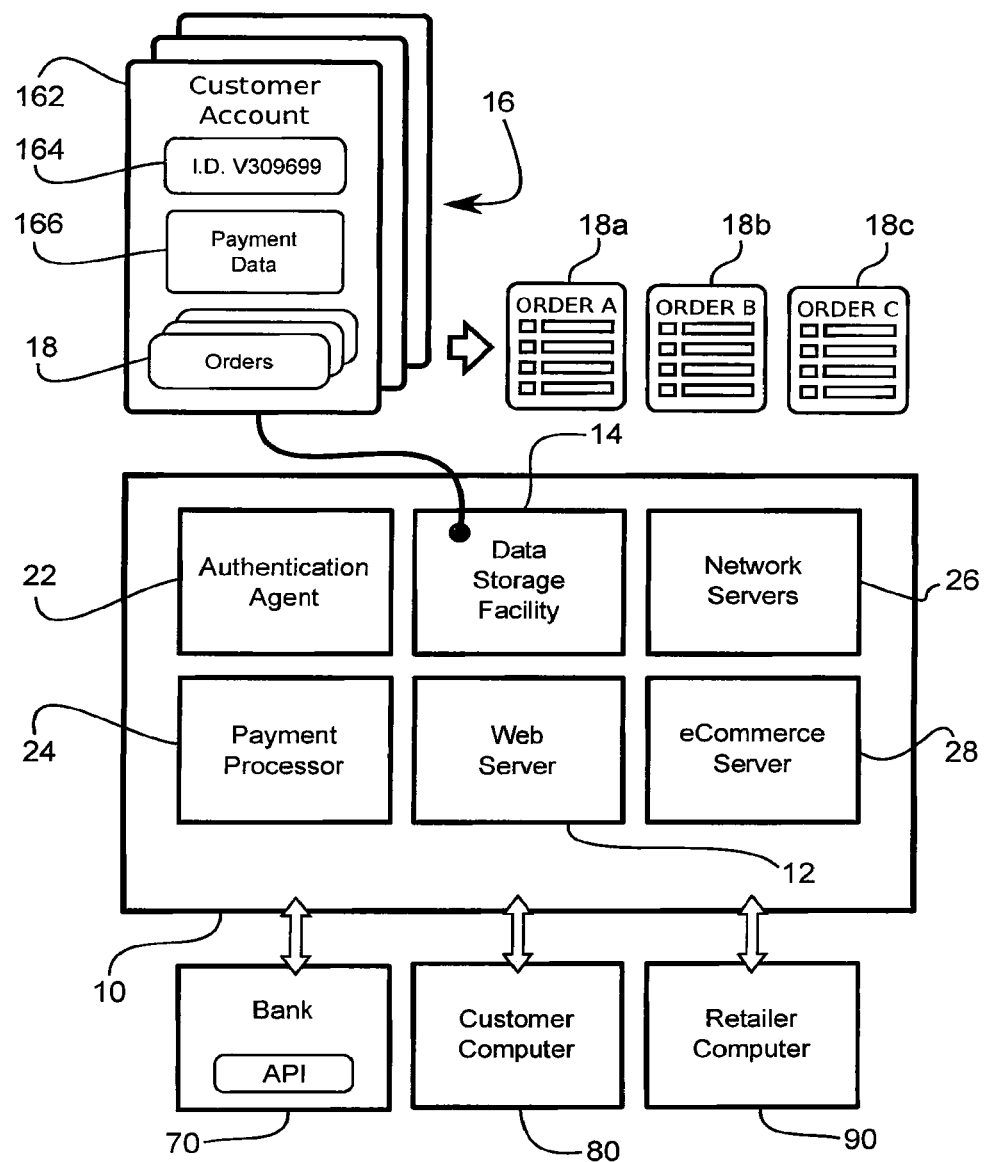
FIG. 1 illustrates schematically an electronic shopping system 10 configured to enable registration and use of multiple item orders 18 within a single customer account 162.

FIG. 1 provides a schematic view of a retailer computer network useful for providing or deploying the electronic shopping system 10 of the invention. As shown therein, the retailer computer network can comprise an authentication agent 22, payment processor 24, data storage facility 14, a web server 12, a network server 26, and an ecommerce server 28.

For embodiments wherein the electronic shopping system is deployed as an ecommerce website, the web server 12 is used to publish the site onto the internet in a manner that allows its content and functions to be accessible to customers using a personal computer 80.

The ecommerce server 14 provides scripted logic, processing, algorithms, and analytical tools for supporting the electronic shopping system and managing the customer transactions therein. Retailer access can be provided within the network or at a appropriate authenticated remote terminal 90. Preferred e-commerce servers include blade-based and/or rack mountable server appliances configured with industry standard e-commerce software and tools, including Web services such as IIS, Apache, iPlanet, Tomcat and application services including Weblogic and Websphere, as well as database services such as Oracle and Microsoft SQL, for conducting secure e-commerce transactions using secure socket layer (SSL).

Payment processor 24—which may be integrated into or separate from the ecommerce server 14—is used to effect electronic payment of item orders 18 submitted by the customer for fulfillment. The payment processor 24 is preferably arranged to work in collaboration with external banking and financial networks and systems 70, typically through the use of APIs.

Authentication agent 22 is used to authenticate a customer's entry into the electronic shopping systems, enabling access into his customer account and submission of an item order for fulfillment (i.e., check-out). Knowledge-based authentication procedures can be utilized where access is effected through a personal computer or personal smartphone. For public terminals and kiosks—or wherever a greater level security is desired—token-based authentication can be deployed provided a suitable reader is available.

The data storage facility 14 is used for storing data used by the electronic shopping system and other network components. In addition to the customer account database 16, the data storage facility can also include libraries, archives, and files relating to merchandise, stores, finances, business operations, market statistics and analytics, electronic transactions, and employee records—any of which may be retrieved and used by the electronic shopping system in its operation.

As will be appreciated by those skilled in the art, the components illustrated in FIG. 1 need not in all instance constitute separate discrete entities. As is known, certain electronic appliances can serve all or some of the functions indicated above. For example, a single server appliance alone can provide all the necessary web publishing, authentication, data storage, functionality needed to support a modest ecommerce storefront within the scope of the present invention. For large retail enterprises, the network infrastructure and its deployment will likely be substantially more massive in scale and complexity.

In respect of technical details and configuration, the retailer operated computer network can be engineered in accordance with well-known network architectures and topologies and—in addition to its unique components—can comprise a plurality of interconnected computers and terminals, servers, hubs, routers, switches, network security devices, wireless nodes and access points, load balancers, and related software.

In preferred embodiments, all or a predefined subset of the retailer's customer account files (i.e., records) are centralized logically or physically within the customer account database 16. There is no critical limitation or particular technical preferences in respect of the data modeling, design, or DBMS utilized for customer accounts. For small retail entities, a general purpose relational database can suffice. On the other hand, for larger enterprises, both proprietary and customer engineered database solutions may be involved.

There is also no particular in respect of the number of customer account records stored in the database. As is well known, different retail fields present different customer demographics and patterns. Moreover, the number of customer account records stored in the database will tend to vary in time. At launch, there will likely be few if any customer accounts.

Within the database, each customer account record 162 can include various personal and transactional information associated with the customer, such as the customer's name, business or employer name, residential or business address, electronic contact information (e.g., landline residential or business telephone number, cell phone number, email addresses, social media account names and identifiers, etc.), payment information 166 (e.g., credit cards, electronic wallets, commercial payment accounts, etc.), a customer-definable address book for frequently used delivery addresses, and information related to customer membership in retailer-affiliated programs, clubs, and communities.

In all instance, the customer account record 162 will includes at least one unique customer account identifier 164. Examples of identifiers include, but are not limited to, an account name, an account identification number, a personal device or appliance ID number, a commercial or professional billing number, or any other data string or block, such as telephone number or address, that is unique by design to the customer account record 162. In accordance with the present invention, the unique identifier 164 definitively identifies the pertinent customer account 162 in relation to which are associated (i.e., linked directly or indirectly) the multiple item orders.

A plurality of "sub-accounts" each bearing a unique identification number can also be utilized, for example, a group of sub-accounts consisting of a "household account", a "commercial account", and a "wishlist account". Consistent with the scope of the invention, each sub-account can by design be limited to a single item order, provided each "sub-account" is linked or otherwise connected to the parent customer account record 162. In such case, the multiple item orders are associated "indirectly" with the customer account record 164 through its linkage to the sub-accounts.

Other electronic information can be stored or linked to the customer account. Examples include: Encrypted or otherwise secured password and authentication information; settings and preferences (accessible or inaccessible) that customize or otherwise affect the customer online experience, such as privacy settings, display preferences, and notification and alert preferences; shopping and browsing history; and historical and transactional records, such as electronic receipts, prior transaction statements, and itemized expense reports.

It is not critical that all data used by the inventive system be stored within the physical confines of the retailer's data storage facilities. For example, customer account information within the retailer data facility 14, including item order and account identification information, can be supplemented or otherwise combined with client-side stored data (e.g., "cookies"). Use of cookies and the like are particularly useful for, and commonly involved in, defining customer setting, guiding and steering customer browsing and shopping, and facilitating account login processes.

Figure 5A:
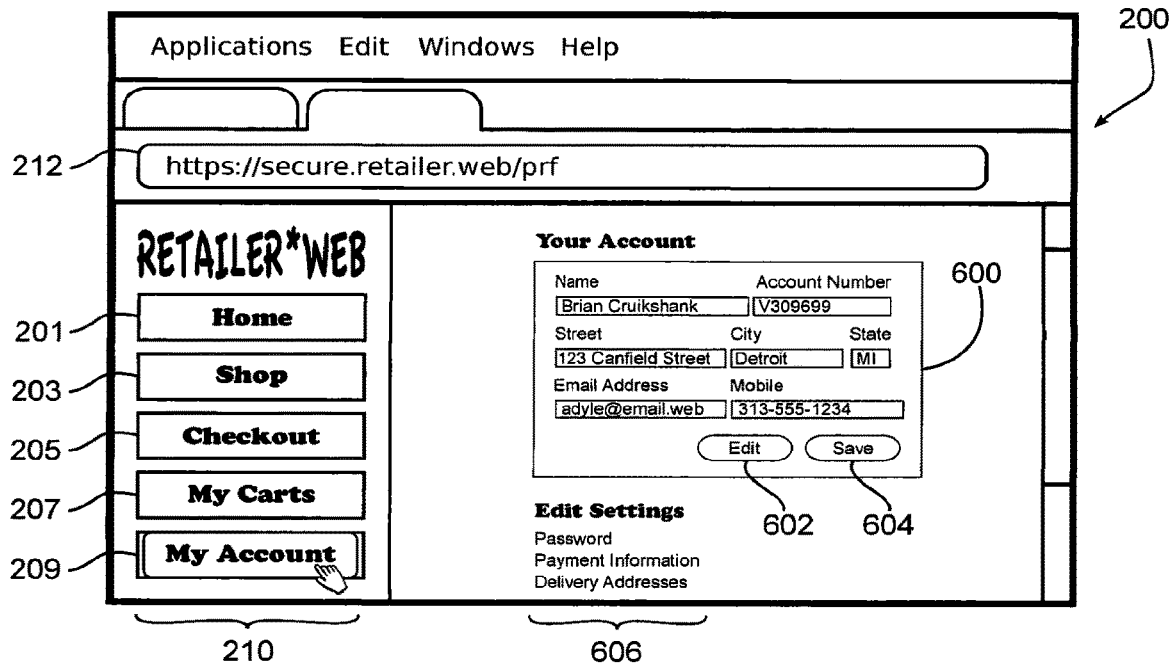
FIG. 5A illustrates schematically a dashboard for customer account management within ecommerce website 200.

As illustrated in FIG. 5A, data and information within a customer account can be added, removed, or edited through an account management tool provided within ecommerce website 200. As shown therein, the account management interface comprises customer information details 600 including several text fields pertinent to the customer account, including the customer's name, physical address, unique account number, and electronic contact information. Interactive buttons 602 and 604 are provided to enable the "editing" and "saving" of the text fields, respectively. Finally, the account management tool also provides text hyperlinks 606 that activate processes for editing other customer account settings, such as "password", "payment information", and "delivery addresses".

The invention is engineered such that once customer access is made, programming is executed that enables the customer to browse through merchandise offered for on-line sale by the retailer and to select among those the items he wishes to purchase. In the preferred ecommerce website, customer access can occur at a first instance upon landing onto the site 200 or at a later time, such as when adding or editing personal shopping carts or at checkout.

Figure 2B:
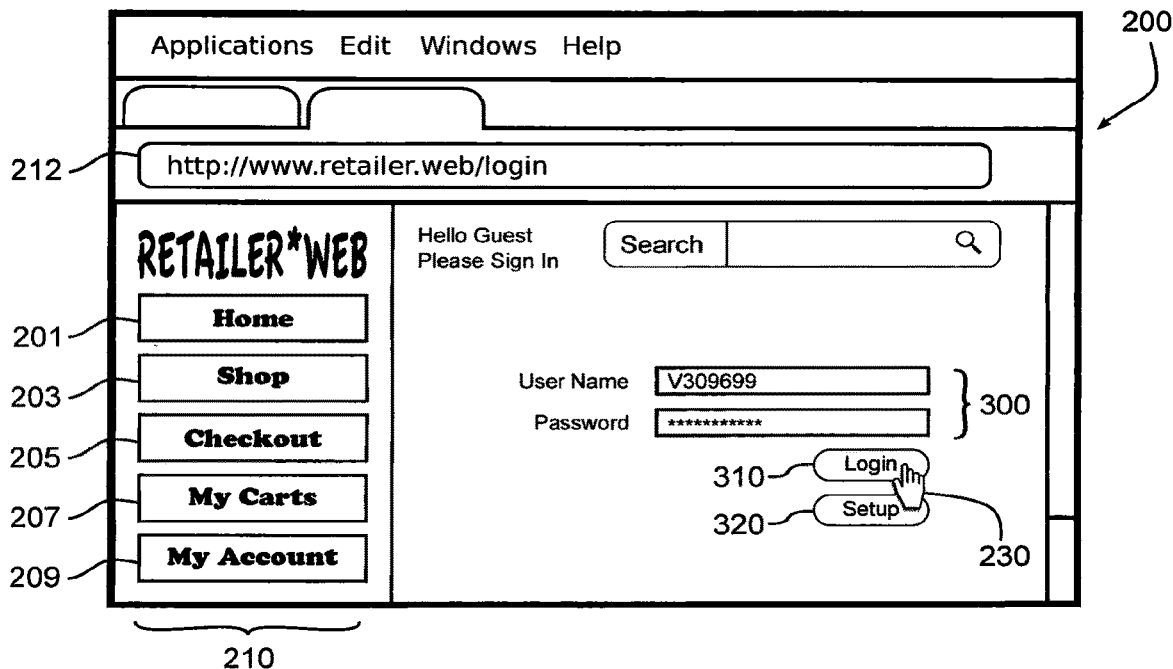

Regardless, for purposes of illustration only, it is assumed herein that the customer is "logged in" at the start, i.e., upon landing onto website 200. In FIG. 2A, after landing, logging in is initiated by moving the browser's pointer 230 to a hyperlinked text prompt (i.e., "Please Sign In") and activating it (i.e., "clicking it"). This deposits the customer on to the login page shown in FIG. 2B.

As shown therein, the login page comprises editable text fields 300 for the customer to enter his credentials, which in this case includes his "User Name" and "Password". If the customer is unregistered, means are provided (cf., the hyperlinked button 320 entitled "Setup") to enable a customer to fill out an online registration. If the credentials entered and submitted via hyperlinked button 320 entitled "Login" are good—cf., sent to and successfully sent back from the authentication agent 000—the customer is then deposited back onto the website in "logged in" mode with an appropriate indicia 162*i* thereof.

Figure 3A:
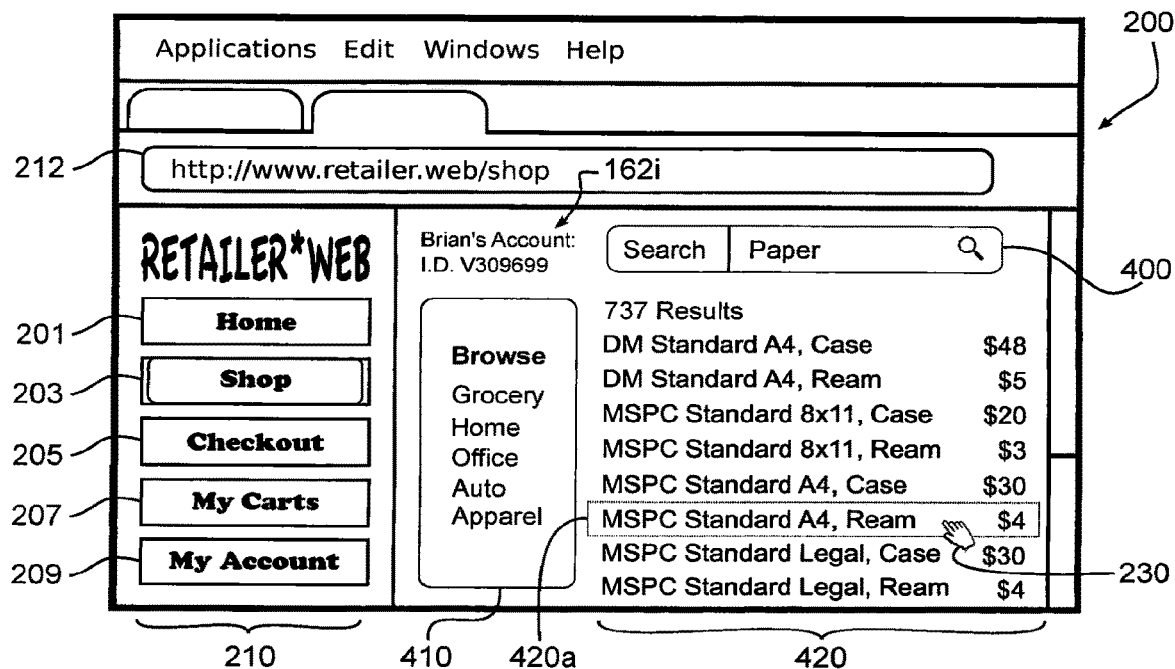
FIGS. 3A and 3B illustrate schematically the "merchandise selection facility" of the ecommerce website 200 and, of particular note, a drop down menu 436 for adding a selected "item of merchandise" 420a into one of several "shopping carts".

As shown in FIG. 3A, ecommerce website 200 includes a customer interface for browsing a catalog of merchandise offering for online sale the retailer's products, services, and like items. The catalog customer interface is accessed by clicking navigation button 203 entitled "Shop" and includes several tools for browsing and searching for merchandise. For example, browse directory 410 is constructed to enable a customer to browse the retailer's merchandise by predefined departments, e.g., "Grocery", "Home", "Office", "Auto", and "Apparel", with each department being defined and identified by hyperlinked text labels, each executing scripts for retrieving and presenting an appropriately filtered list of item records from the retailer's data storage facility 14. Alternatively, more precise searching is provided by a user input search field 400, which enables a customer to enter an alphanumeric string (e.g., a brand name, a product class, a serial number, a product description, etc.) to query the merchandise information recorded in the retailer's data storage facility 14. For example, querying the keyword "paper"—as shown in FIG. 3A—results in a list of potentially relevant items 420.

Figure 3B:
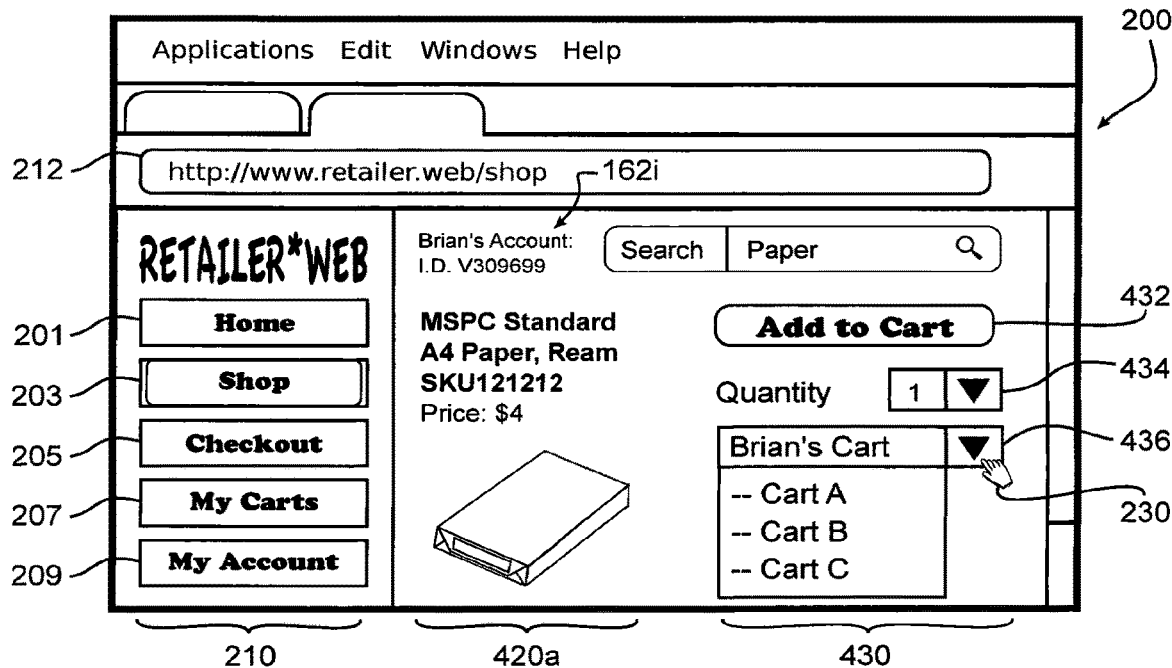

In accordance with the invention, an individual item of merchandise 420*a* such as included in retrieved list 420—can be "selected" by by the customer, for example, using pointer 230. By "pointing and clicking" merchandise item 420*a*, the website 200 shown in FIG. 3B is programmed to display further details and information about the selected item 420*a*.

Website 200 also includes an activatable button 432 for adding the item into at least one of a plurality of item orders (i.e., "Cart A", "Cart B", and "Cart C"). Selection of the desired item order is effected utilizing a drop down menu 436, which can be programmed to identify all existing customer created item orders (i.e., "Carts A to C"), a default cart (i.e., hypothetically entitled "Brian's Cart"), and a "New Cart" (i.e., shown in FIG. 4A).

For ecommerce websites serving mass retail customers, the selection and placement of items into separate shopping carts may be desirable or pertinent only to certain customers or for occasional shopping sessions. In which case, the ecommerce website is programmed such that multi-cart utility is affected only upon clear customer intent, thus maintaining a good "click through rate" for online ordering. This is accomplished, for example, by defining a default cart within the drop down cart selector 436 (cf., "Brian's Cart" in FIG. 3B), assuring that the customer always has a cart ready to be brought directly to check out without additional user input to create one or select one.

The user interface for browsing, selecting, and placing items in user definable carts need not in all embodiments require a sophisticated interactive graphical user interface, particularly where the electronic shopping system is designed for B2B customers. In such instance, the user interface can be comparatively unadorned and utilitarian, for example, consisting only of text fields and forms for entering discrete item information (e.g., serial numbers or SKUs) and creating and populating definable carts and orders. Where item information in an order is entered into a tabular form by typing a product serial code, the discrete activation and inactivation thereof can be accomplished, for example, by appropriately inserting a radio button or like toggle proximate the entry field.

As used herein, the term "item order" shall be defined as any list, table, array, register, roll, log, or other record created by the customer through the electronic shopping system, and identifying directly, or by means of pointers, references, codes, tags, and the like, one or more items of merchandise that the customer intends to purchase through the system either at the time of selection or potentially later, if at all.

As indicated above, in ecommerce websites, item orders are customarily called "shopping cart" or "shopping baskets". In accordance, with present invention a customer can shop online using more the one shopping cart, each of which can be checked out or saved (for later use) and each capable of being discretely edited with regard to item contents and processing and fulfillment (e.g., delivery and payment). When checked out, if the customer desires, the cart is saved for later use, such that the customer need not have to find and enter the product again in a return shopping session.

In addition to the means for selecting merchandise from the retailer online catalog, the electronic shopping system also includes means for purchasing the contents of a customer's item orders. This is accomplished through the incorporation therein of a purchase facility.

The purchase facility of the electronic shopping systems is programmed to provide at least two purchase-related functions. First, it enables—through a "order review interface"—the review and modification by a customer of his or her item orders. Second, it enables—through a "order submission interface"—the submission by a customer of his or her item orders for further processing and fulfillment by the retailer (cf., "checkout").

Figure 5B:
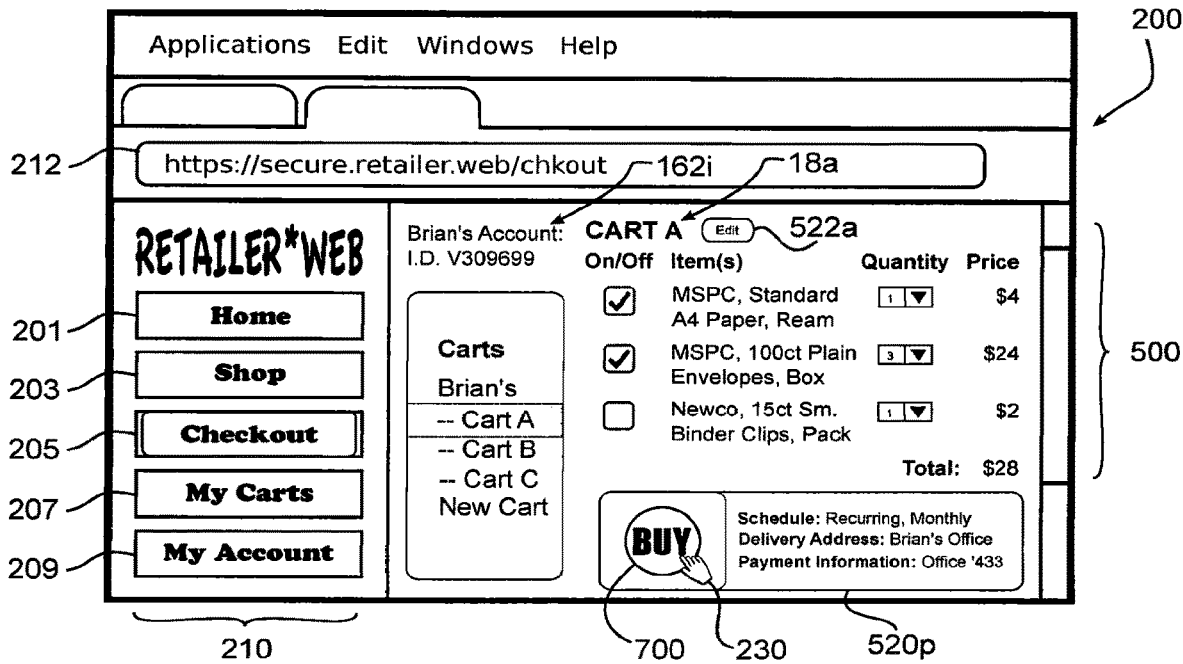
FIG. 5B illustrates schematically an "order submission interface" 700 for submitting an actively selected "item order" 18a for further order processing and fulfillment.

In ecommerce website embodiments, the order review interface and order submission interface (as well as their underlying functions) can be scripted or programmed onto different pages or html files (e.g., a shopping cart review page and checkout page) or onto a single page or file merging or otherwise combing the two functions (see e.g., FIG. 5B). Hyperlinks, frames, keys, cookies, tokens, and the like can be used to link, connect, associate, or otherwise share the pages and files of the order review and submission interfaces to effect a desired customer workflow and to reduce the number of "clicks" between "landing" and "checkout".

In a preferred configuration, the order review interface comprises any combination of informational text; interactive menus, lists and tables; radio buttons and check boxes; and manual inputs fields and forms, supported with appropriate hardware, data files, and programmed logic. These components are arranged to enable an authenticated customer to (a) access for review all item orders associated with the customer's user account, (b) edit and save information associated with each item order (i.e., "order related information"), and (c) edit and save information associated with each item contained within an item order (i.e., "item related information"). In respect of editing and saving—as discussed further below—"order scheduling" and "item purchase status" are key types of "order related information" and "item related information", respectively.

Figure 4A:
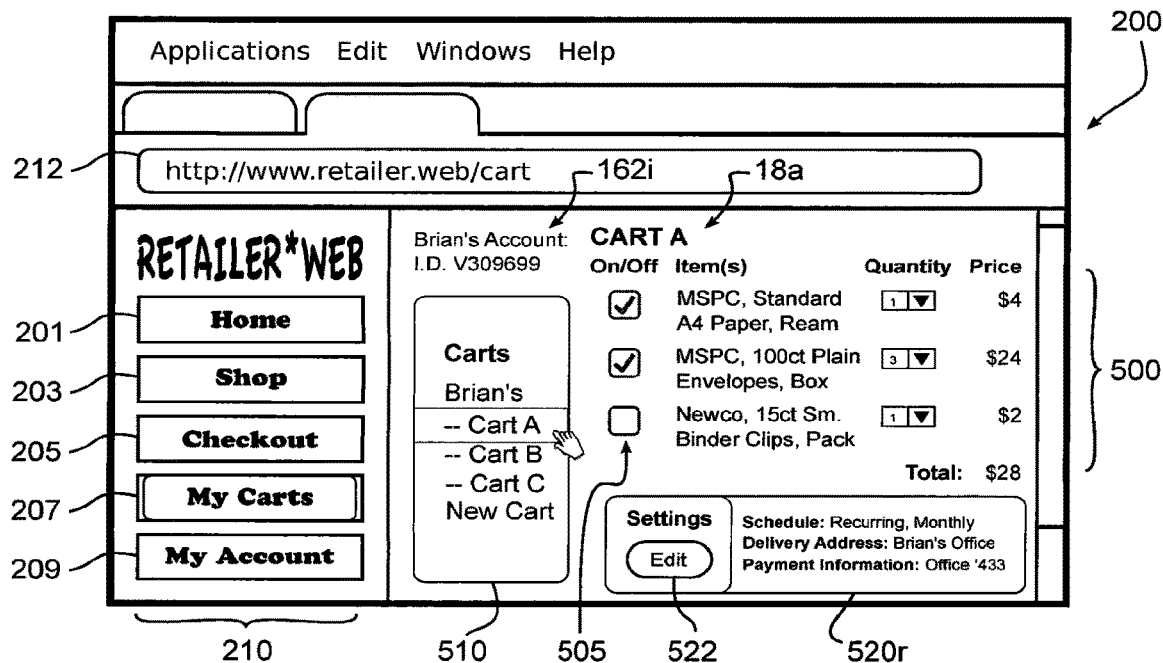
FIG. 4A illustrates schematically the "order review interfaces" 500, 510 and 520 for registering and managing a customer's item orders, including checkbox means 505 for toggling an item's "purchase status" between "active" and "inactive" states.
Figure 4B:
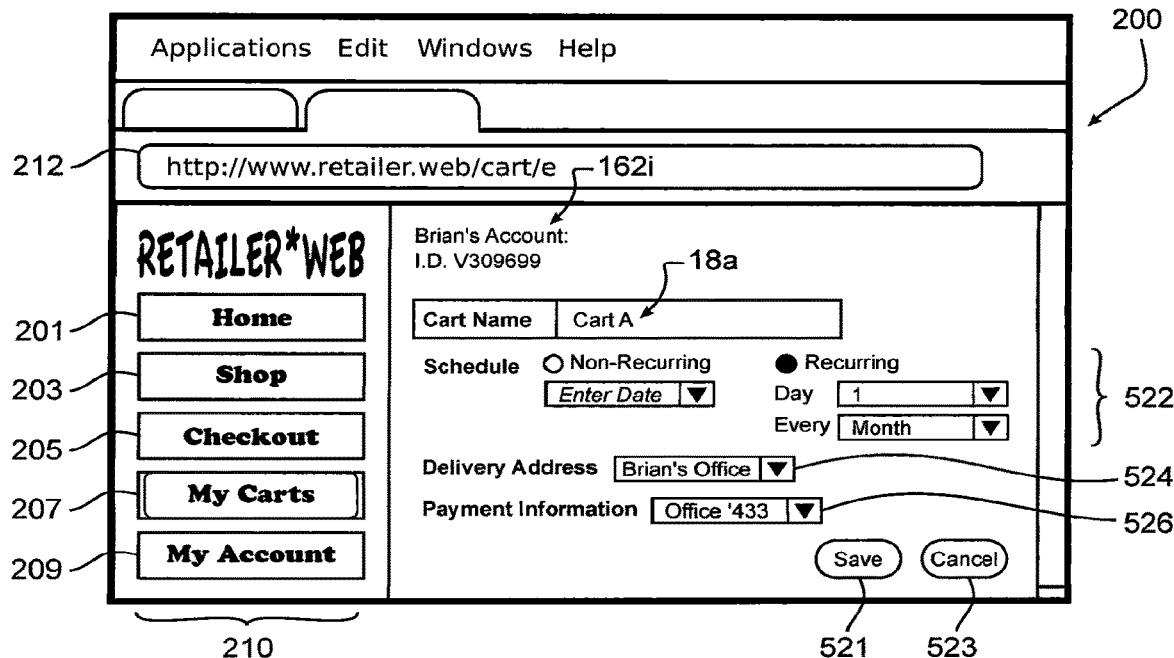
FIG. 4B illustrates schematically the order review interfaces 521-526 for configuring an order's "frequency" and "schedule".

FIGS. 4A and 4B schematically illustrate a representative order review interface, the interface being accessed via pointing and clicking navigation button 207 entitled "My Carts".

As shown in FIG. 4A, the order review interface include a interactive menu 510, an interactive order content list 500, and an order settings panel 520r. The interactive menu 510 is scripted to enable the customer to "pull" and display the contents of each of his item orders. For example, clicking "Cart A" in the menu 510 results in generation of order content list 500 based on the data associated with the customer's item order 18a. The order content list 500 itself includes a list of all items contained in the order (each having an item description and price), an interactive drop down menu for editing quantity information, and an interactive checkbox 505 for editing item purchase status information. Finally, order settings panel 520r includes informational text providing the current delivery, schedule, and payment settings for the order 18a and an interactive button 522 hyperlinked to the order information editing functions of the order review interface as illustrated in FIG. 4B.

As shown in FIG. 4B, the order editor include means for entering, modifying, and selecting the schedule 522, delivery address 524, and payment information 526 for the active item order 18a associated with the active customer account 162i. The scheduling means 522 comprises radio buttons and drop down menus for determining the frequency and schedule for the order. Drop down menus populated with data retrieved from customer account records are used for the delivery address 524 and payment information 526. After review and editing, a customer can save or cancel any of his modifications using the interactive "Save" and "Cancel" buttons 521 and 523, both programmed to ultimately deposit the customer back to the order review interface of FIG. 4A following execution of any underlying cancellation and save scripts.

After reviewing his item orders through the order review interface, the customer can take the next step and, using the systems order submission interface, proceed towards consummating or otherwise executing the purchase thereof as per the customer's order settings. In a preferred configuration, the order submission interface comprises any combination of informational text; interactive menus, lists and tables; radio buttons and check boxes; and manual inputs fields and forms, supported with appropriate hardware, data files, and programmed logic, arranged to enable an authenticated customer to submit any active order for processing and fulfillment in accordance with the customer's order settings.

FIG. 5B schematically illustrates a representative "order submission interface", the interface being accessed via pointing and clicking navigation button 205 entitled "Checkout".

As shown therein, the order submission interface includes an interactive menu 510, an order content list 500, and an order purchase panel 520p. These components can operate similarly to their counterparts used in the order review interface, and—as such—can utilize largely the same HTML resources and assets. However, the order content list here includes an interactive button 522a entitled "Edit" which links back to the order review interface of FIG. 4A. And, the order purchase panel 520p replaces the order settings edit button 522 of FIG. 4A with an interactive order purchase button 700 entitled "Buy".

The "Buy" button 700 is programmed to submit active and identified item order 18a for further order processing and fulfillment. Downstream processes are variable, and can include, order compilation and preliminary screening; customer and payment authentication; order queuing and prioritization; routing to internal and external fulfillment facilities; data extraction for statistical pattern and trend analyses; and finally, packaging, shipping, and delivery to the client.

As stated, in addition to the enablement of multiple item orders, the inventive system is programmed to allow customers to refine each of their order on a discrete basis. Thus, prior to and at checkout, a customer can review and modify any of his default or previously defined settings for both the order itself (i.e., "order information") and the items contained therein (i.e., "item information").

Examples of configurable "item information" include, but are not limited to item "quantity" (e.g., an SKU quantity for consumer goods, a weight for produce, a dimension or measurement for building materials and supplies, and dosages or supply time for pharmaceuticals), "supplier" or "brand" (e.g., the supplier of unpackaged bulk items sold as commodities), item "quality" (e.g., a grade, certification, or composition), item "class" (e.g., "organic", "free trade", "kosher", etc.) and—most importantly—item "purchase status".

As used herein, "purchase status" data is defined as any electronically-recorded data, information, or indicia, associated with an item of merchandise, that describes, signifies, encodes, represents, or indicates whether the item will be included for further processing and fulfillment when a listing order is submitted at check out by a customer.

By having such a variable, the customer can in essence create a reusable order template wherein items can be disabled, rather than removed, saving the customer time and effort in return shopping sessions involving identical or similar orders.

When a customer selects a "disable" option for an item, the disabled item remains on the order, but will not be included for fulfillment and delivery upon checkout. On subsequent shopping session, the customer can retrieve the order from his account and—if he then wishes—activate the previously disabled item and submit the order again. Since both active and inactive items are retained on the order, the returning customer will not need to search again for the inactive item to resubmit the order, as would be the case in a conventional online store.

If desired, disabling an item within an item order can, in addition to being retained within the original, result in it being automatically copied to a new or pre-designated order that serves as a repository for inactive or disabled items. To avoid overpopulation or overloading of such orders in high-activity customer accounts, the automated copying functionality can be configured, for example, to execute only on non-recurring item orders actually submitted for checkout.

With regard to configurable payment and delivery information, examples include, but are not limited to, delivery address (e.g., selecting among personal addresses, office addresses, client addresses, and business and branch locations), payment source (e.g., selecting among personal credit cards, financial institutions, and commercial debit accounts), and frequency and scheduling (discussed below.

Pursuant to the invention, customer configuration of any of such "order information" will apply to the item order as a whole, affecting the further processing and fulfillment of all "active" items listed therein (i.e., items tagged with authorizing "purchase status" data).

"Order frequency", as discussed herein, relates to whether an order is "recurring" or "non-recurring" order. The electronic shopping system 10 is programmed to automatically repeat execution of any order that a customer designates to be "recurring" following a predefined schedule. The schedule is defined by the customer using a suitable interface for setting the desired times for shipment or delivery of the order.

Although a drop down calendar (or the like) can be used to enter specific dates, more preferably, the scheduling interface is designed to epitomize a cascading, branching, or nested sequence of certain broad temporal parameters (e.g., a day, a day of the week, a week, or a month) and values (e.g., "first", "every", "last", etc.) that can be combined to create a more generic schedule (e.g., "every month", the "first week of every quarter", "biweekly", or "the first Monday of each month"). Temporal parameters can also be included to define the starting and termination dates for a recurring order.

The granularity at which scheduling is preferably executed within the system's programming will, of course, depend in large part on factors external thereto, such as distribution channel capacity and capabilities, distance and other geographic factors, and commercial and fiscal variables. Regardless—finely specified or not—the order will repeat automatically as per the schedule.

To avoid cluttering the interface with unnecessary distractions, the system is programmed to present scheduling tools only when a customer designates an order to be recurring. For example, the order review interface 522 in FIG. 4B can be programmed such that the active order's frequency is set at "non-recurring" in its default state, with the various drop down menus for selecting temporal parameters remaining hidden until the customer toggles the frequency to "recurring".

Since the electronic shopping system and many of its processes are largely automated, it is advantageous to provide customers with electronics notices and alerts to inform them of important upcoming or current events and changing terms and conditions. Preferably, the notices are sent from the retailer's system 10 to the customer's email address or mobile phone number. Both of which, as shown in FIG. 5A, can be registered by the customer into the customer account 600 within the ecommerce website 200.

The electronically notices and alerts can be transmitted automatically, periodically, or on an "as needed" basis. For example, electronic notices can be sent automatically when an order is shipped, when an order is delivered, when a recurring order is activated, or when a recurring order is approaching a termination date. Similarly, electronic reminders can be periodically sent when an order or item is outstanding or inactive in excess of a predetermined time period. And finally, electronic alerts can be sent "as needed", for example, when an item has been discontinued, is subject to a price change, or becomes unavailable, limited, or delayed.

In certain embodiments, the electronic shopping system can be programmed such that entire orders or individuals items placed in those orders are automatically terminated or removed after a predetermined period of dormancy. An electronic notification can be issued alerting the customer of the oncoming expiry and requesting action if execution is to be avoided.

In certain modes of practice, the electronic notice, reminder, or alert can include a request for customer input. As is known in the art, such communication can—in addition to providing all pertinent item and order information—include an embedded interface allowing the customer to provide his input within the communication platform without have to login or otherwise enter back into the electronic shopping system.

Although several embodiments of the invention are disclosed herein, those skilled in the art having the benefits of this disclosure can effect modifications thereto. These modifications are to be construed as encompassed within the scope of the invention as set forth in the appended claims.

The invention claimed is:

1. An electronic shopping system comprising:
   a customer account database,
   a merchandise selection facility,
   an authentication agent, and
   a purchase facility, wherein:
   the authentication agent is configured to authenticate one or more remote customers of a plurality of retail customers accessing the electronic shopping system over a network through remote customer computing devices, and enable remote access over the network to databases of merchandise information;
   the customer account database comprises a plurality of customer account records;
   the merchandise selection facility comprising a catalog of merchandise and the merchandise selection facility is configured to:
   allow each authenticated customer of the plurality of retail customers to each remotely create and manage multiple different item orders contemporaneously in association with a single customer account record associated with that customer, remotely access over the network the merchandise information, and to select one or more items in said catalog for inclusion in at least one of several potential item orders associated with a single customer account record corresponding to said customer;
   default each customer to a single item order until express intent is received from the customer to utilize multiple different item orders and providing enhanced purchase through rate for those customers not intending to implement multiple item orders;
   communicate data to cause to be displayed to the customer a plurality of item order options each corresponding to one of multiple item orders associated with the single customer account record;
   receive from the remote customer computing device a selection of one or more of the multiple item orders associated with the single customer account record and into which a selected one or more items selected from said catalog are to be included; and
   maintain the customer account database remote from the customers to associate the selected one or more items with the selected one or more item orders; and
   the purchase facility comprising an order review interface wherein the purchase facility causes data to be communicated to cause the remote customer computing device to display the order review interface allowing the customer to discretely review and modify said item orders associated with said single customer account record;

wherein the purchase facility is configured to automatically repeat execution of purchases of the one or more items of each of the multiple item orders associated with the single customer account record that are designated as recurring item orders in accordance with corresponding defined recurring schedules; and wherein the order review interface is communicated to cause order frequency data to be displayed, and enables modification of the purchase status data for the one or more items of each of the multiple item orders, and wherein the order review interface causes communication of modifications of the frequency data to indicate that one or more of the item orders is either a recurring order or a non-recurring order.

2. The electronic shopping system of claim 1, wherein each of said item orders comprises payment information, delivery information, and item information for each item included in the item order, said item information comprising item quantity data and purchase status data.

3. The electronic shopping system of claim 2, wherein the delivery information includes the order frequency data and order scheduling data.

4. The electronic shopping system of claim 3, wherein the order scheduling data comprises a starting date of a recurring order and a termination date of the recurring order.

5. The electronic shopping system of claim 3, wherein the order review interface enables modification of the order scheduling data to specify a temporal parameter for delivery or shipment of the item order.

6. The electronic shopping system of claim 5, wherein the temporal parameter is configured to display on the remote customer computing device as a cascading sequence of temporal parameters and values that when selected by the customer combine to define at least part of the ordered scheduling data.

7. The electronic shopping system of claim 1, comprising an order notification facility, wherein:
said order notification facility transmits an automated predefined notification relating to said item order to a customer at a customer contact included in said customer account record.

8. The electronic shopping system of claim 1 wherein each item order of said customer is recorded within the customer account record of said customer.

9. The electronic shopping system of claim 8, wherein the customer account database, the merchandise selection facility, and a purchase facility are hosted on a retailer computer network.

10. The electronic shopping system of claim 9, wherein the merchandise selection facility and the purchase facility are accessible by the customer through an internet protocol.

11. The electronic shopping system of claim 1, wherein the purchase facility is further configured to cause the order review interface to be displayed that includes a navigation option that when activated causes the display of a listing of item orders associated with the single customer account record.

12. The electronic shopping system of claim 11, wherein the order review interface comprises an interactive menu comprising scripting that induces a pulling of item order information, and causes a display of the listing of item orders.

13. The electronic shopping system of claim 11, wherein the navigation option comprises a drop down menu such that causing the plurality of item order options to be displayed further comprises causing a listing of the plurality of item order options each corresponding to one of multiple item orders associated with the single customer account record to be displayed in response to a selection of the navigation option.

14. The electronic shopping system of claim 1, wherein the merchandise selection facility is configured to: communicate data to cause to be displayed to the customer a new item order option, after a product is selected, that is selectable by the customer allowing the customer to create a new item order; create a new item order in response to detecting a selection of the new item order option; and add the selected product to the newly created item order.

15. The electronic shopping system of claim 1, wherein the merchandise selection facility is configured to: define a first of the multiple item orders as a default item order.

16. The electronic shopping system of claim 1, wherein the merchandise selection facility is configured to generate an alert to notify the customer of a change affecting a product specified in one of the item orders associated with the customer.

17. The electronic shopping system of claim 1, wherein the electronic shopping system is further configured to automatically determine a status of at least one of the multiple item orders associated with the single customer account record, and automatically cause a notification of the status of the at least one of the multiple item orders to be communicated to the customer.

18. The electronic shopping system of claim 1, wherein the electronic shopping system is further configured to establish the item order as a reusable order template that is usable in establishing subsequent one or more item orders.

19. The electronic shopping system of claim 1, wherein multiple customer account records of the plurality of customer account records further comprise a plurality of sub-accounts each being associated with a unique identification number and associated with the corresponding one of the plurality of customer account records, and wherein each sub-account corresponds to a single item order of the multiple item orders associated with the corresponding customer account record.

20. A method of enabling electronic shopping through recurring orders comprising:
authenticating, through an authentication agent, one or more remote customers of a plurality of retail customers accessing an electronic shopping system over a network through remote customer computing devices and enabling remote access over the network to databases of merchandise information;

allowing each authenticated customer of the plurality of retail customers to each remotely create and manage multiple different item orders contemporaneously in association with a single customer account record associated with that customer and maintained in a customer account database comprising a plurality of customer account records, remotely access over the network the merchandise information, and to select one or more items in a catalog of merchandise for inclusion in at least one of several potential item orders associated with a single customer account record corresponding to said customer;

defaulting each customer to a single item order until express intent is received from the customer to utilize multiple different item orders and providing enhanced purchase through rate for those customers not intending to implement multiple item orders;

communicating data to cause to be displayed to the customer a plurality of item order options each corresponding to one of multiple item orders associated with the single customer account record;

receiving from a remote customer computing device corresponding to the customer a selection of one or more of the multiple item orders associated with the single customer account record and into which a selected one or more items selected from said catalog are to be included; and maintaining the customer account database remote from the customers to associate the selected one or more items with the selected one or more item orders; and causing data to be communicated to cause the remote customer computing device to display an order review interface and allowing the customer to discretely review and modify said item orders associated with said single customer account record;

automatically repeating execution of purchases of the one or more items of each of the multiple item orders associated with the single customer account record that are designated as recurring item orders in accordance with corresponding defined recurring schedules; and wherein the order review interface is communicated to cause order frequency data to be displayed, and enabling modification of the purchase status data for the one or more items of each of the multiple item orders, and receiving communication of modifications of the frequency data to indicate that one or more of the item orders is either a recurring order or a non-recurring order.

* * * * *